(12) United States Patent
Zhang et al.

(10) Patent No.: US 9,171,116 B1
(45) Date of Patent: Oct. 27, 2015

(54) METHOD AND SYSTEM FOR REDUCING REDUNDANT LOGIC IN AN INTEGRATED CIRCUIT

(71) Applicant: Cadence Design Systems, Inc., San Jose, CA (US)

(72) Inventors: Peng Zhang, Pudong New Area (CN); Nan Zhuang, Sunnyvale, CA (US); Yuhua Yang, Oixin Road (CN)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 14/488,039

(22) Filed: Sep. 16, 2014

(51) Int. Cl.
*G06F 17/50* (2006.01)

(52) U.S. Cl.
CPC .......... *G06F 17/505* (2013.01); *G06F 2217/78* (2013.01); *G06F 2217/84* (2013.01)

(58) Field of Classification Search
USPC .................. 716/102, 104, 105, 106
See application file for complete search history.

(56) References Cited

U.S. PATENT DOCUMENTS

| | | | |
|---|---|---|---|
| 7,441,212 B1* | 10/2008 | van Antwerpen et al. .... | 716/132 |
| 2011/0283250 A1* | 11/2011 | Manohararajah ............. | 716/132 |

* cited by examiner

*Primary Examiner* — Brian Ngo
(74) *Attorney, Agent, or Firm* — Kaye Scholer, LLP

(57) ABSTRACT

An apparatus and method are provided for removing redundant logic in a logic design of an integrated circuit (IC) design. The apparatus and method optimizes the integrated circuit by selecting stuck-at constant registers in the logic design, propagating a constant output value of the stuck-at constant registers across output nets of the stuck-at constant registers, identifying redundant logic in the logic design based on the propagation of the constant input value across the output net of the stuck-at constant register, and removing the redundant logic in the logic design.

15 Claims, 13 Drawing Sheets

METHOD AND SYSTEM FOR REDUCING REDUNDANT LOGIC IN AN INTEGRATED CIRCUIT

FIELD

The present patent document generally relates to integrated circuit design, and, more particularly, to a method and system for reducing redundant logic created by logic synthesis during integrated circuit design.

BACKGROUND

Present digital integrated circuits (ICs) contain millions and even billions of combinational and sequential logic gates, along with the necessary connections there between to operate in a desired manner. As a result, integrated circuit (IC) design has become a significantly laborious and complex process that involves several different steps.

Because of the large number of combinational and sequential logic gates, designers use a hardware description language (HDL) to specify the structure, design and operation of the circuit. HDLs are specialized computer languages that enable a precise, formal description of an electronic circuit that allows for the automated analysis, simulation, and simulated testing of the IC.

Once the HDL design is complete, a step called logic synthesis is performed by which an abstract form of desired circuit created by the HDL is turned into a design implementation in terms of logic gates, typically by a computer program called a synthesis tool. The output of a synthesis tool is called a netlist, which is a list of the combinational and sequential logic gates, and their connections, and is, in effect, the IC logic design that can be fabricated into an IC. Following logic synthesis, additional logic is inserted into the netlist to enable scan tests, which enable testing of manufactured ICs to determine IC detects. The basic concept of a scan test is to connect memory elements of the designed integrated circuit (e.g., flip flops or latches) forming chains, so that shifting test data through the scan chains enables the tester to observe the state of the manufactured IC.

FIG. 1 illustrates a conventional scan cell 100 that can be inserted into the netlist after synthesis. Scan cell 100 includes a multiplexer 110 with two inputs 112a, 112b, a selector input 114 to receive a "scan_enable" signal EN and an output 116 that is coupled to an input of flip flop 120. The multiplexer 110 is coupled to a flip flop 120 (i.e., a register or storage element of the IC). The flip flop 120 includes an input 122 and clock input 124 and an output 126. In this design, the first input 112a of the multiplexer 110 receives the functional data (often referred to as functional data signal (D)), the second input 112b receives scan-in data (often referred to as scan-in data signal (SI)), and the selector input 114 receives the selector input signal (often referred to as the scan_enable signal (SE)). If the selector signal is disabled or a low signal (i.e., a "0" digital signal input), the multiplexer 110 will pass the functional data signal (D) to the input 122 of the flip flop 120. In other words, during normal operation of the integrated circuit, the selector signal will be low, such that the flip flop is receiving the functional data. In contrast, if the scan_enable signal SE is enabled during a scan test, the scan-In data signal SI will be passed to the input 122 of the flip flop 120. Once these scan cells are created, the scan cells are connected into "scan chains," which are usually accessed through test pins. FIG. 2 illustrates an example of shifting scan data through a conventional scan chain.

Even when a logically perfect IC design results from synthesis, the netlist corresponding to the HDL program may be less than optimal. One significant issue that can result from synthesis and scan chain insertion is the existence of unnecessary or redundant logic in the netlist. Redundant logic can be combinational or sequential logic gates in the IC's netlist that are unnecessary or irrelevant to the functionality of the IC. While a single redundant logic gate will have no bearing on the operation or size of the IC, a netlist for an IC containing millions or billions of logic gates might have a significant number of redundant logic gates, the removal of which would such would significantly decrease overall chip area once the IC is fabricated and provide significant flexibility to timing optimization of the IC.

SUMMARY

An apparatus and method for removing redundant logic in a logic design of an integrated circuit (IC) design after synthesis. The apparatus and method optimizes the integrated circuit by selecting stuck-at constant registers in the logic design, propagating a constant output value of the stuck-at constant registers across output nets of the stuck-at constant registers, identifying redundant logic in the logic design based on the propagation of the constant input value across the output net of the stuck-at constant register, and removing the redundant logic in the logic design.

According to an embodiment, a method is disclosed of removing redundant logic in an integrated circuit design that has been synthesized by a logic synthesis tool. The method includes providing, in memory of a computer system, a logic design of at least a portion of an integrated circuit that includes a plurality of combinational and sequential logic gates; identifying at least one register in the logic design that has a constant output value when a selector or control signal of the register is either enabled or disabled; propagating the constant output value across an output net of the identified at least one register; identifying redundant logic of the logic design based on the propagation of the constant output value across the output net of the identified at least one register; and modifying the logic design in the memory of the computer system to remove the identified redundant logic.

In another embodiment, the method includes selecting at least one starting point in the logic design; traversing an input net of the at least one starting point towards the identified at least one register; and marking a combinational logic gate encountered during traverse of the input net.

In a refinement of the disclosed method during propagating the constant output value, the method further includes propagating the constant output value across an unmarked combinational logic gate in the output net of the identified at least one register; and if a register having a same selector signal as the identified at least one register is in an output net of the unmarked combinational logic gate, disconnecting the output net of the identified at least one register from an input net of the unmarked combinational logic gate and providing the constant output value to as an input value to the input net of the identified unmarked combinational logic gate.

In a refinement of the disclosed method during propagating the constant output value, the method further includes propagating the constant output value across the marked combinational logic gate in the output net of the identified at least one register; and if a register having a same selector signal as the identified at least one register is coupled in an output net of the marked combinational logic gate, disconnecting the output net of the marked combinational logic gate from an input net of the register having the same selector and providing the constant output value to the input net of the register having a same selector signal.

In a refinement of the disclosed method during selecting the at least one starting point, the method further selecting the at least one starting point comprises selecting the at least one starting point in the logic design from the group of a primary output, a black box, a scan_in input pin of a register, a control input pin of a register and one or more input pins of other sequential instances.

In a refinement of the disclosed method during of identifying at least one register in the logic design that has a constant output value, the method further includes identifying the register if the register has an enabled clear control signal and a disable or disconnected preset control signal; the register has an enabled preset control signal and a disabled or disconnected clear control signal; the register has a functional data input value of 0 and a disabled or disconnected preset control signal; or the register has a functional data input value of 1 and a disabled or disconnected clear control signal.

According to an embodiment, a system for removing redundant logic in an integrated circuit design after logic synthesis is disclosed. In this embodiment, the system includes a storage device encoded with information representative of a logic design of at least a portion of an integrated circuit that includes a plurality of combinational and sequential logic gates; and a computing device in communication with the storage device, the computing device configured to identify at least one register in the logic design that has a constant output value when a selector or control signal of the register is either enabled or disabled; propagate the constant output value across an output net of the identified at least one register; identify redundant logic of the logic design based on the propagation of the constant output value across the output net of the identified at least one register; and modify the logic design in the memory of the computer system to remove the identified redundant logic.

According to an embodiment of the disclosed system, the computing device is further configured to select at least one starting point in the logic design; traverse an input net of the at least one starting point towards the identified at least one register; and mark a combinational logic gate encountered during traverse of the input net.

According to an embodiment of the disclosed system, when the computing device propagates the constant output value, the computing device is further configured to propagate the constant output value across an unmarked combinational logic gate in the output net of the identified at least one register; and if a register having a same selector signal as the identified at least one register is in an output net of the unmarked combinational logic gate, disconnect the output net of the identified at least one register from an input net of the unmarked combinational logic gate and provide the constant output value to as an input value to the input net of the identified unmarked combinational logic gate.

According to an embodiment of the disclosed system, when the computing device propagates the constant output value, the computing device is further configured to propagate the constant output value across the marked combinational logic gate in the output net of the identified at least one register; and if a register having a same selector signal as the identified at least one register is coupled in an output net of the marked combinational logic gate, disconnect the output net of the marked combinational logic gate from an input net of the register having the same selector and provide the constant output value to the input net of the register having a same selector signal According to an embodiment of the disclosed system, when the computing device selects the at least one starting point, the computing device is further configured to select the at least one starting point in the logic design from the group of a primary output, a black box, a scan_in input pin of a register, a control input pin of a register and one or more input pins of other sequential instances.

According to an embodiment of the disclosed system, the computing device is further configured to identify the at least one register in the logic design that has a constant output value it the register has an enabled clear control signal and a disable or disconnected preset control signal; the register has an enabled preset control signal and a disabled or disconnected clear control signal; the register has a functional data input value of 0 and a disabled or disconnected preset control signal; or the register has a functional data input value of 1 and a disabled or disconnected clear control signal.

In another embodiment, a computer-readable non-transitory storage medium is disclosed having stored thereon a plurality of instructions, said plurality of instructions when executed by a computer, cause said computer to perform operations comprising identifying at least one register in a logic design of at least a portion of an integrated circuit that includes a plurality of combinational and sequential logic gates, in which the at least one register has a constant output value when a selector or control signal of the register is either enabled or disabled; propagating the constant output value across an output net of the identified at least one register; identifying redundant logic of the logic design based on the propagation of the constant output value across the output net of the identified at least one register; and modifying the logic design in the memory of the computer system to remove the identified redundant logic.

According to an embodiment of the disclosed computer-readable non-transitory storage medium, the plurality of instructions when executed by a computer, cause said computer to further perform selecting at least one starting point in the logic design; traversing an input net of the at least one starting point towards the identified at least one register; and marking a combinational logic gate encountered during traverse of the input net.

According to an embodiment of the disclosed computer-readable non-transitory storage medium, the plurality of instructions when executed by a computer, cause said computer to further perform propagating the constant output value across an unmarked combinational logic gate in the output net of the identified at least one register; and if a register having a same selector signal as the identified at least one register is in an output net of the unmarked combinational logic gate, disconnecting the output net of the identified at least one register from an input net of the unmarked combinational logic gate and providing the constant output value to as an input value to the input net of the identified unmarked combinational logic gate.

According to an embodiment of the disclosed computer-readable non-transitory storage medium, the plurality of instructions when executed by a computer, cause said computer to further perform propagating the constant output value across the marked combinational logic gate in the output net of the identified at least one register; and if a register having a same selector signal as the identified at least one register is coupled in an output net of the marked combinational logic gate, disconnecting the output net of the marked combinational logic gate from an input net of the register having the same selector and providing the constant output value to the input net of the register having a same selector signal.

According to an embodiment of the disclosed computer-readable non-transitory storage medium, the plurality of instructions when executed by a computer, cause said computer to further perform, during selecting the at least one starting point, selecting the at least one starting point in the logic design from the group of a primary output, a black box, a scan_in input pin of a register, a control input pin of a register and one or more input pins of other sequential instances.

According to an embodiment of the disclosed computer-readable non-transitory storage medium, the plurality of instructions when executed by a computer, cause said computer to further perform identifying a register as the register with a constant output value if the register has an enabled clear control signal and a disable or disconnected preset control signal; the register has an enabled preset control signal and a disabled or disconnected clear control signal; the register has a functional data input value of 0 and a disabled or disconnected preset control signal; or the register has a functional data input value of 1 and a disabled or disconnected clear control signal.

The above and other preferred features described herein, including various novel details of implementation and combination of elements, will now be more particularly described with reference to the accompanying drawings and pointed out in the claims. It should be understood that the particular methods and apparatuses are shown by way of illustration only and not as limitations of the claims. As will be understood by those skilled in the art, the principles and features of the teachings herein may be employed in various and numerous embodiments without departing from the scope of the claims.

BRIEF DESCRIPTION OF THE DRAWINGS

The accompanying drawings, which are included as part of the present specification, illustrate the presently preferred embodiments and together with the general description given above and the detailed description of the preferred embodiment given below serve to explain and teach the principles described and claimed herein.

FIGS. 4A-7A illustrate four exemplary instances for identifying the stuck-at constant registers in a logic design according to exemplary embodiments.

FIGS. 4B-7B illustrate the resulting logic of FIGS. 4A-7A after the constant value of the stuck-at constant register has been propagated across the register according to exemplary embodiments.

Figure 1:
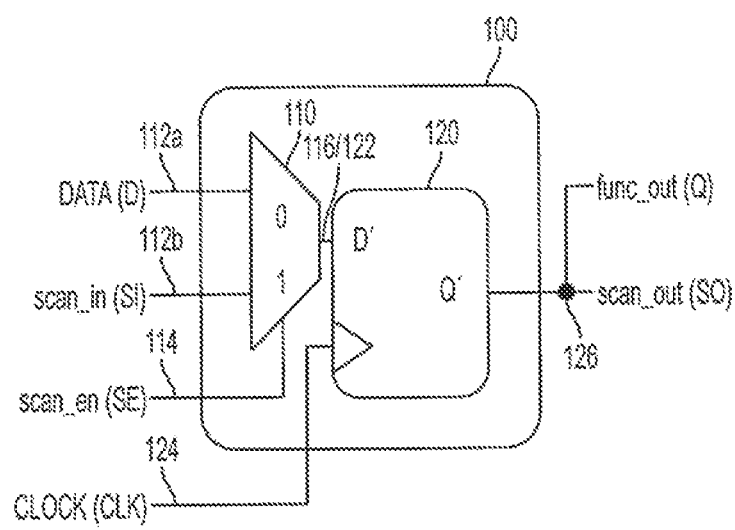
FIG. 1 illustrates a conventional scan cell for an exemplary scan chain design.
Figure 2:
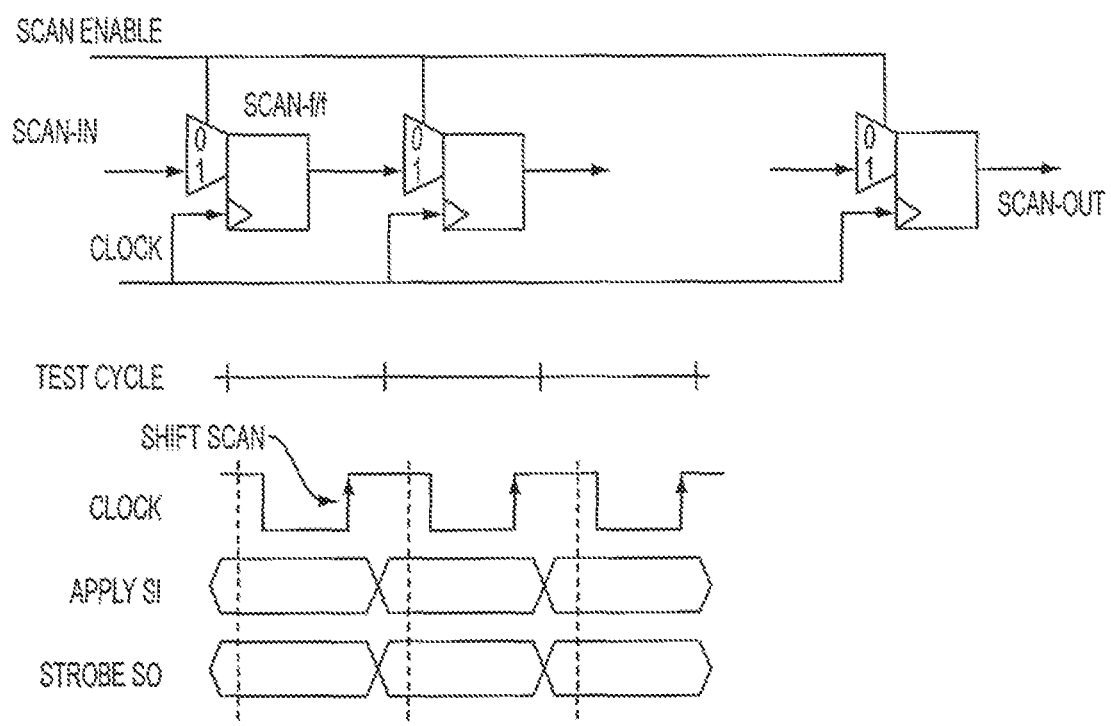
FIG. 2 illustrates an example of shifting scan data through a regular scan chain using a conventional scan chain.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION OF THE PREFERRED EMBODIMENTS

The following description is presented to enable any person skilled in the art to create and use a computer system configuration and related method to remove redundant logic from a logic design of an integrated circuit. Each of the features and teachings disclosed herein can be utilized separately or in conjunction with other features to implement the disclosed system and method. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for purposes of explanation only, specific nomenclature is set forth to provide a thorough understanding of the present teachings. However, it will be apparent to one skilled in the art that these specific details are not required to practice the present teachings.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiments described herein also relate to an apparatus for performing the operations herein. This apparatus may be specially constructed for the required purposes, or it may comprise a general purpose computer selectively activated or reconfigured by a computer program stored in the computer. Such a compute program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a compute system bus.

The algorithms presented herein are not inherently related to any particular computer or other apparatus. Various general purpose systems, design verification systems such as a hardware emulator, simulator, and hardware-accelerated simulator systems, or testers providing scan inputs to such design verification systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings as described herein.

Moreover, the various features of the representative examples and the dependent clams may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Figure 3A:
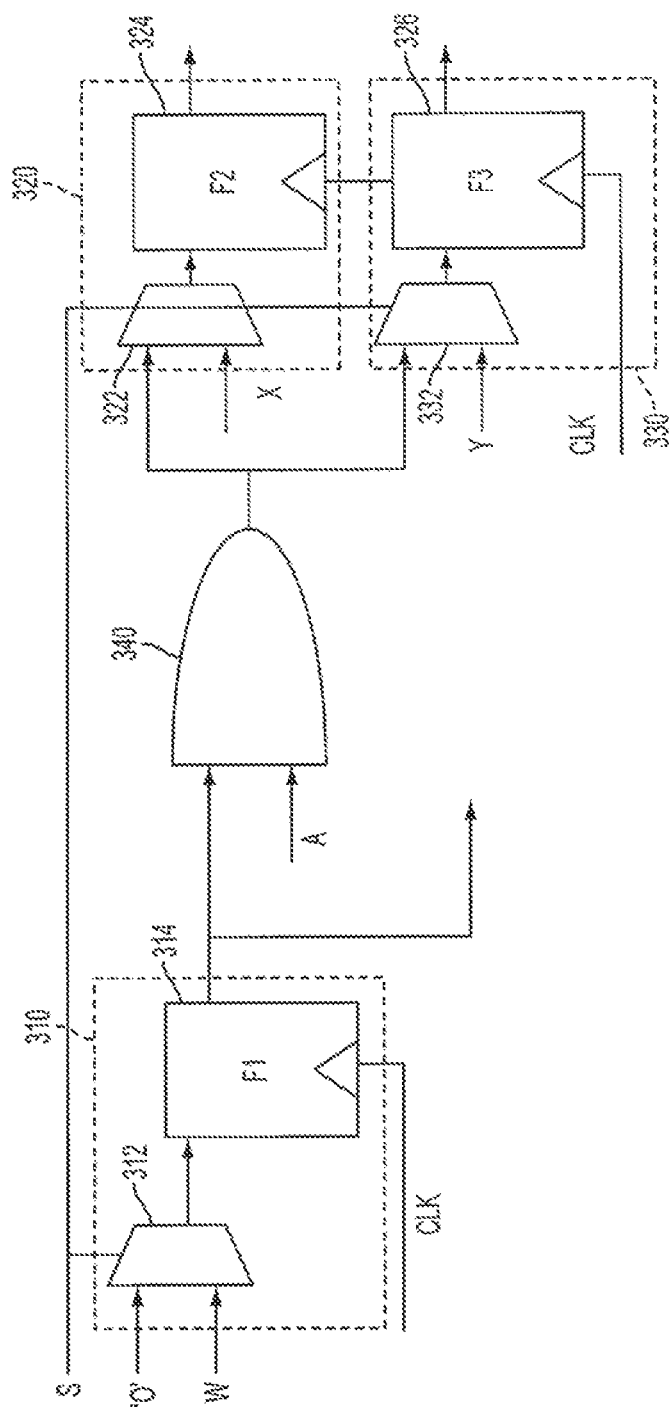
FIG. 3A illustrates a block diagram of a portion of a logic design or model of an integrated circuit with redundant logic before optimization according to an exemplary embodiment.
Figure 3B:
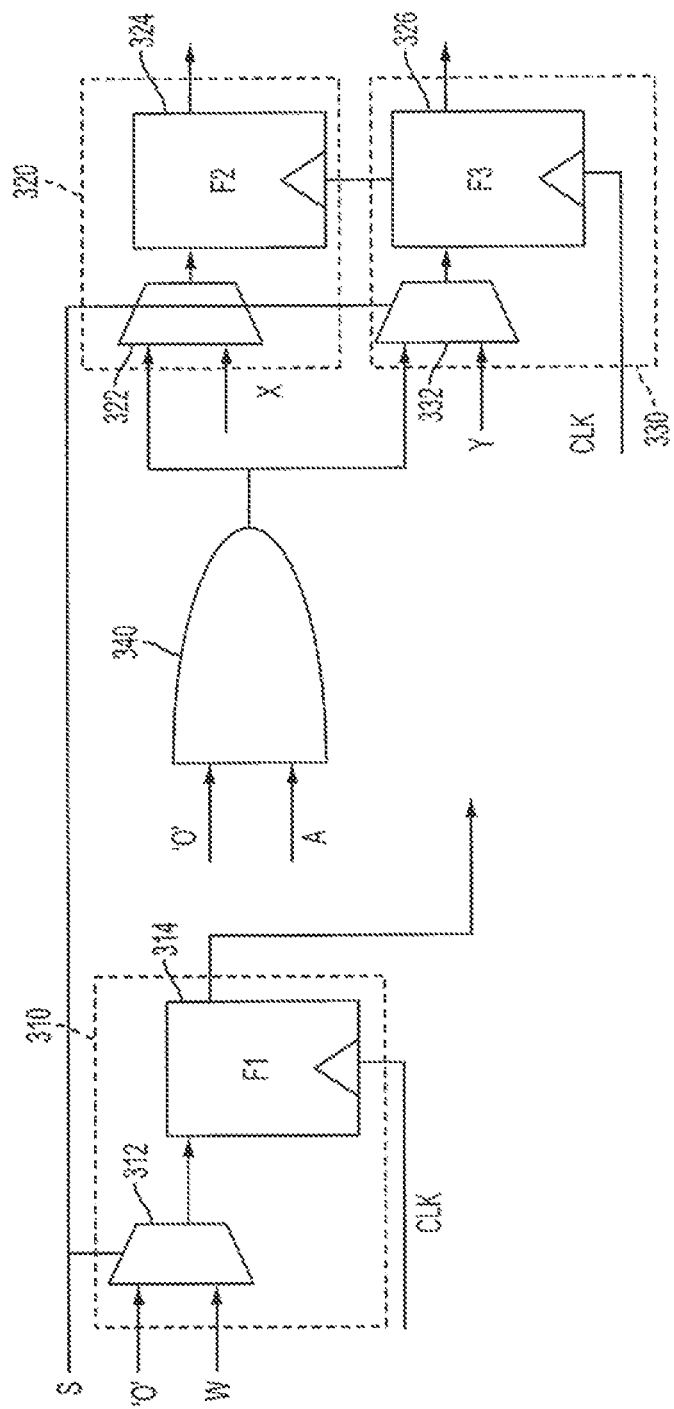
FIG. 3B illustrates the resulting logic design/model after the optimization analysis has been performed according to an exemplary embodiment.

FIG. 3A illustrates a block diagram of a portion of a logic design or model of an integrated circuit that is the result of synthesis of a HDL design, and which, as will be seen, has redundant logic. FIG. 3B illustrates the resulting logic design/model after the optimization analysis has been performed according to the disclosure herein. FIGS. 3A and 3B are provided to illustrate the advantageous results of removing redundant logic according to the system and method, which will be described in greater detail below with respect to the subsequent figures.

As shown in FIG. 3A, the exemplary logic design includes three scan cells 310, 320 and 330, which comprise the same design as that discussed above with respect to FIG. 1. It should be appreciated that while the exemplary logic design can be a portion of a scan chain, the disclosure herein is not so limited. As shown, scan cell 310 comprise a multiplexer 312 with two input pins, a selector input pin, and an output pin coupled to flip flop 314. The first input pin or the multiplexer 312 receives the functional data of the integrated circuit, which in the exemplary circuit is a low data input of "0". Furthermore, the second input in receives a scan_in data signal represented by "W", which can be either a "0" or a "1". Furthermore, the output pin of multiplexer 312 is coupled to the input pin of the flip flop 314 and the selector input pin receives a selector signal or scan_enable signal SE.

As further shown, the output pin of the flip flop 314 is connected to an input of a logic circuit 340. In the exemplary embodiment, the logic circuit 340 is simplified and represented as an AND gate, but it should be appreciated that the logic circuit 340 can be any design of combinational logic, for example, any one or combination of AND gates, XOR gates, NOR gates, registers, latches, and the like. The second input pin of the logic circuit receives a data signal "A", which can be either a "0" or a "1", but is a "don't care" input as will be explained in detail below. The output pin of flip flop 314 is illustrated with an additional open-ended arrow. It should be appreciated that this output can also be wired to additional logic in the integrated circuit (not shown) or to an input pin of scan cell 320, in the event that the logic design of FIG. 3A forms a scan chain as would be understood to one skilled in the art.

As further shown, scan cells 320 and 330 each include a multiplexer 322 and 332, respectively, each having a functional data input pin coupled to the logic circuit 340. Further, scan_in data signals "X" and "Y" are provided to the second inputs of multiplexers 322 and 332, respectively. Scan cells 320 and 330 also each include a flip flop 324 and 334, which are respectively coupled to the outputs of multiplexer 322 and 332. Moreover, each of the flip flops 314, 324, 334 of the respective scan cells includes a clock input to receive a clock signal CLK as would be understood to one skilled in the art. Although not shown, it should also be appreciated that the output of scan cell 330 can be connected to the scan_in input pin of scan cell 320 to form the scan chain as would be understood to one skilled in the art.

The method and system described herein are designed to optimize the logic design of the integrated circuit by eliminating redundant logic. It should be understood that the optimization is performed using a specially programmed computer system (discussed below) to analyze a model of the logic design of the IC, identify redundant logic, and modify the logic design to remove the identified redundant logic. The optimization can be performed after the netlist of the IC is generated from logic synthesis and/or after additional logic is inserted into the netlist to form scan chains.

FIG. 3A illustrates a logic design of an IC having redundant logic. To illustrate, when the scan_enable signal SE is low or a "0", the output of flip flop 314 of scan cell 310 will also be a "0", i.e., it will be the same value as the functional data input to multiplexer 312. As a result, the output of logic circuit 340, which is an AND gate, will also be a low signal "0". This output signal is the functional data input for multiplexers 322 and 332, and, therefore, the input signal for flip flops 324 and 334, which are also controlled by the scan_enable signal SE, which is a "0". During the next state of the flip flop 314 (i.e., during scan enable when the scan_enable signal SE becomes a "1"), the data input of flip flop 314 is the scan_input signal "W", which is output to logic circuit 340. Because logic circuit 340 is an AND gate in this example, the output of logic gate 340 is based on the values of "W" and "A". However, because scan_enable signal SE is a "1", the inputs of multiplexers 324 and 334 are the respective scan_input signals "X" and "Y" (since the scan is enabled), not the functional data inputs coupled to the output of the logic circuit 340. In other words, the "W" output and "A" output observability by flip flops 324 and 334 are both "don't care" inputs because neither data value "W" or data value "A" will affect the input of either flip flops 324 or 334.

Employing the processes described below, the system and method described herein identify this redundant logic in the logic design of the integrated circuit and remove it accordingly. FIG. 3B illustrates a block diagram of the exemplary logic design of the integrated circuit of FIG. 3A after the redundant logic has been removed. That is, the don't care term "W" is pushed across flip flop 314 with the output net from flip flop 314 disconnected from the input net of logic circuit 340. Additionally, the first input of logic circuit 340 is set to a constant value of "0", which represents the same data output value that flip flop 314 is "stuck at" if the scan_enable signal SE were set to "0", as discussed above. Since the output of the logic circuit 340 is irrelevant when signal_enable signal SE is "1", the output of multiplexers 324 and 334 will still be correct even though the output of logic circuit 340 is a constant "0", i.e., logic circuit 340 being an AND gate with a constant input of "0" as shown in FIG. 3B. Accordingly, by disconnecting the net between flip flop 314 and logic circuit 340, the redundant logic of the exemplary logic design can be removed.

It should further be appreciated that logic circuit 340 is illustrated as a simple AND gate in the exemplary logic design of FIGS. 3A and 3B. In this instance, because the first input is set to a constant "0", the output of logic circuit 340 will always be "0". In such a simple example, logic circuit 340 can be removed altogether and the functional data input pins of multiplexers 322 and 332 can both be set to "0". However, as noted above, it is understood that logic circuit 340 can be a combination of logic gates. It is actually the input net of logic circuit 340 that is set to a constant "0". In either event, removing such redundant logic from the logic design reduces chip area of the manufactured IC and shortens the critical path between flip flop 314 and either of flip flops 324 and 334, which would improve overall performance and reduce power consumption of the manufactured IC.

As will be described in detail below with respect to FIGS. 8A and 8B, the exemplary method removes redundant logic from a logic design of an integrated circuit by first identifying "stuck-at constant" registers in the design. For purposes of this disclosure, a stuck-at constant register is a register whose output is a constant "0" or "1" when certain selector or control signals (e.g., a scan_enable signal, a preset signal or a clear signal) are enabled or disabled. The exemplary method contemplates four separate algorithms for identifying stuck-at constant registers. In each case, once the stuck-at constant register is identified, the constant value of the stuck at constant register is propagated or "pushed across" the register. For example, as described above with respect to FIGS. 3A and 3B, flip flop 314 would be identified as a stuck-at constant register and the constant value "0" is propagated across the register 314 to the input net of logic circuit 340.

FIGS. 4A-7A illustrate four exemplary algorithms for identifying the stuck-at constant registers in a logic design of an integrated circuit. FIGS. 4B-7B illustrate the resulting logic of the registers in FIGS. 4A-7A after the constant value of the register has been propagated across the stuck-at constant register according to exemplary embodiments.

Figure 4A:
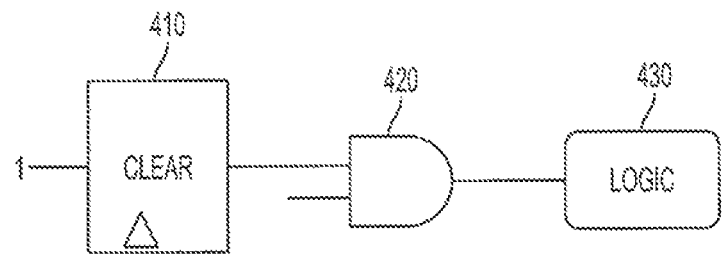

In particular, FIG. 4A illustrates a stuck-at constant register 410 in which the clear input of the register is enabled (i.e., set to a high value of "1") and the preset input is disabled or does not exist for this register. As shown, an output of the register 410 is coupled to an input pin of a combinational logic gate 420 (shown as an AND gate), the output of which may be coupled to additional logic 430. Since the clear input is enabled and the preset input is disabled, the output of the register 410 will be low, i.e., set to a value of "0", regardless of any synchronous inputs of the register, including the functional data input D, the scan_in signal SI and the like. Accordingly, because Q is a constant value of "0", the system and method identify register 410 as a stuck-at constant register, meaning the output Q is "stuck at" a value of "0".

Figure 4B:

Once register 410 is identified to be a stuck-at constant register, the constant input value is propagated across the register as illustrated in FIG. 4B. As shown, the combinational logic gate 420 (shown in FIG. 4A) is removed from the circuit design after propagation because it is redundant. Specifically, because the output Q of register 410 is "0", the output of the AND gate 420 will also be "0" regardless of the value of its second input pin. Therefore, a constant value of "0" can be supplied as the input to the additional logic 430 as shown in FIG. 4B and the combinational logic gate 420 can be removed since it is redundant logic.

Figure 5A:
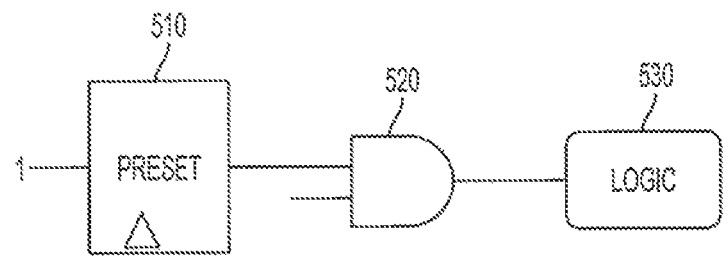

FIG. 5A illustrates a second example of a stuck-at constant register that outputs a constant value. As shown, FIG. 5A contemplates a design configuration in which a preset input of register 510 is enabled (i.e., set to a high value of "1") and its clear input is disabled or does not exist for this register. Similar to FIG. 4A, an output of the register 510 is coupled to an input pin of a combinational logic gate 520 (also shown as an AND gate), the output of which may be coupled to additional logic 530. Since the preset input is enabled and the clear input is disabled, the output of the register 510 will be high, i.e., set to a value of "1", regardless of the synchronous inputs of the flip flop, including the functional data input D, the scan_in signal SI and the like. Because Q is a constant value of "1", the system and method identify register 510 as a stuck-at constant register, meaning the output Q is "stuck at" a value of "1".

Figure 5B:
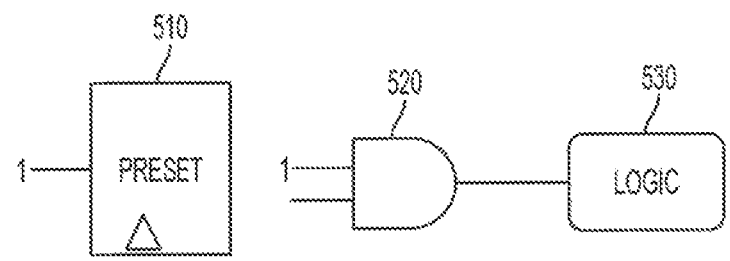

Once register 510 is identified to be a stuck-at constant register, the constant input value is propagated across the register as illustrated in FIG. 5B. In contrast to the example of FIG. 4B, the combination logic gate 520 cannot be removed from the circuit design after propagation. Specifically, because the output Q of register 510 is "1", the output of the combinational logic gate 420, which is an AND gate, is dependent on the value of the second input pin. Therefore, the net between the output Q of the register 510 and the logic gate 420 can be disconnected, but a constant value of "1" will need to be supplied as the first input to the logic gate 420. The net between the logic gate 420 and the additional logic 430 remains unchanged.

Figure 6A:
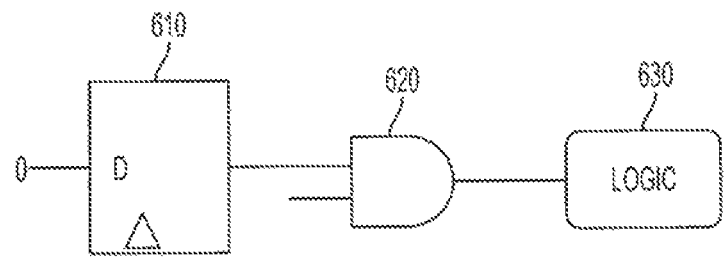

FIG. 6A illustrates a third example of a stuck-at constant register that outputs a constant value. This example illustrates a similar design as that discussed above with respect to FIGS. 3A and 3B. FIG. 6A contemplates a design in which a functional data input D of register 610 is set to a constant low value of "0" and the present input is disabled or does not exist for this register. Similar to the designs above, for illustrative purposes the output Q of the register 610 is coupled to an input pin of a combinational logic gate 620 (also shown as an AND gate), which has an output coupled to additional logic 630. Since the preset input is disabled and the functional data input D is "0", the output of the register 610 will be low, i.e., set to a value of "0". Of course, this assumes that the scan-enable signal SE is turned off. Moreover, because Q is a constant value of "0", the system and method identify register 610 as a stuck-at constant register, meaning the output Q is "stuck at" a value of "0".

Figure 6B:
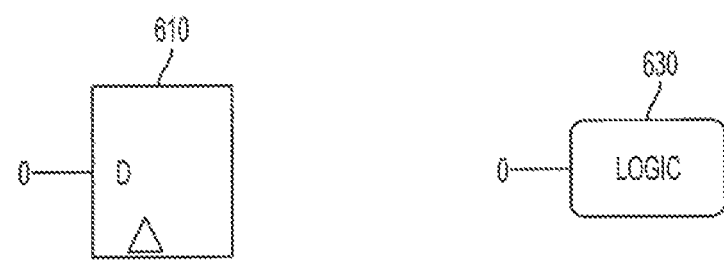

Once register 610 is identified to be a stuck-at constant register, the constant input value "0" is propagated across the register as illustrated in FIG. 6B. As shown, the combinational logic gate 620 (shown in FIG. 6A) is removed from the circuit design after propagation. Because the output Q of register 610 is "0", the output of the AND gate 620 will also be "0" regardless of the value of its second input pin. Therefore, a constant value of "0" can be supplied as the input to the additional logic 630 as shown in FIG. 6B and the combinational logic gate 620 can be removed since it is determined to be redundant logic.

Figure 7A:
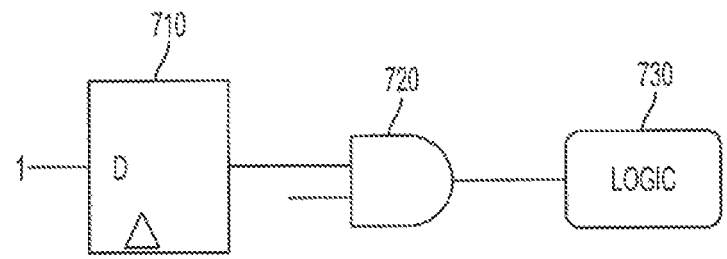

FIG. 7A illustrates a fourth example of a stuck-at constant register that outputs a constant value. In this instance, a functional data input of register 710 is set to a constant high value of "1" and the clear input is disabled or does not exist for this register. Similar to the designs above, for illustrative purposes the output Q of the register 710 is coupled to an input pin of a combinational logic gate 720 (also shown as an AND gate), which has an output coupled to additional logic 730. Since the clear input is disabled and the functional data input D is "1", the output of the register 710 will be high, i.e., set to a value of "1". Similar to FIG. 6A, this analysis is performed under the condition that the scan-enable signal SE is turned off. Because Q is a constant value of "1", the system and method identify register 710 as a stuck-at constant register, meaning the output Q is "stuck at" a value of "1".

Figure 7B:
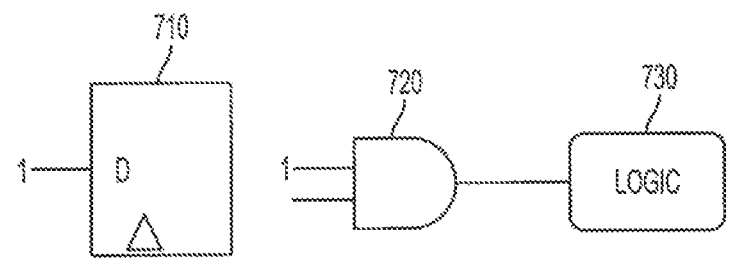

Once register 710 is identified to be a stuck-at constant register, the constant input value is propagated across the register as illustrated in FIG. 7B. In contrast to the example of FIG. 6B, the combination logic gate 720 cannot be removed from the circuit design after propagation. Specifically, because the output Q of register 710 is "1", the output of the combinational logic gate 720, which is an AND gate, is dependent on the value of the second input pin. Therefore, the net between the output Q of the register 710 and the logic gate 720 can be disconnected, but a constant value of "1" will need to be supplied as the first input to the logic gate 720. The net between the logic gate 720 and the additional logic 730 remains unchanged.

Applying the foregoing algorithms described above with respect to FIGS. 4A-7A to identify stuck-at constant registers in a logic design of an IC, the system and method described herein can perform a redundant logic analysis for the logic design and remove identified redundant logic in the design of the integrated circuit.

Figure 8A:
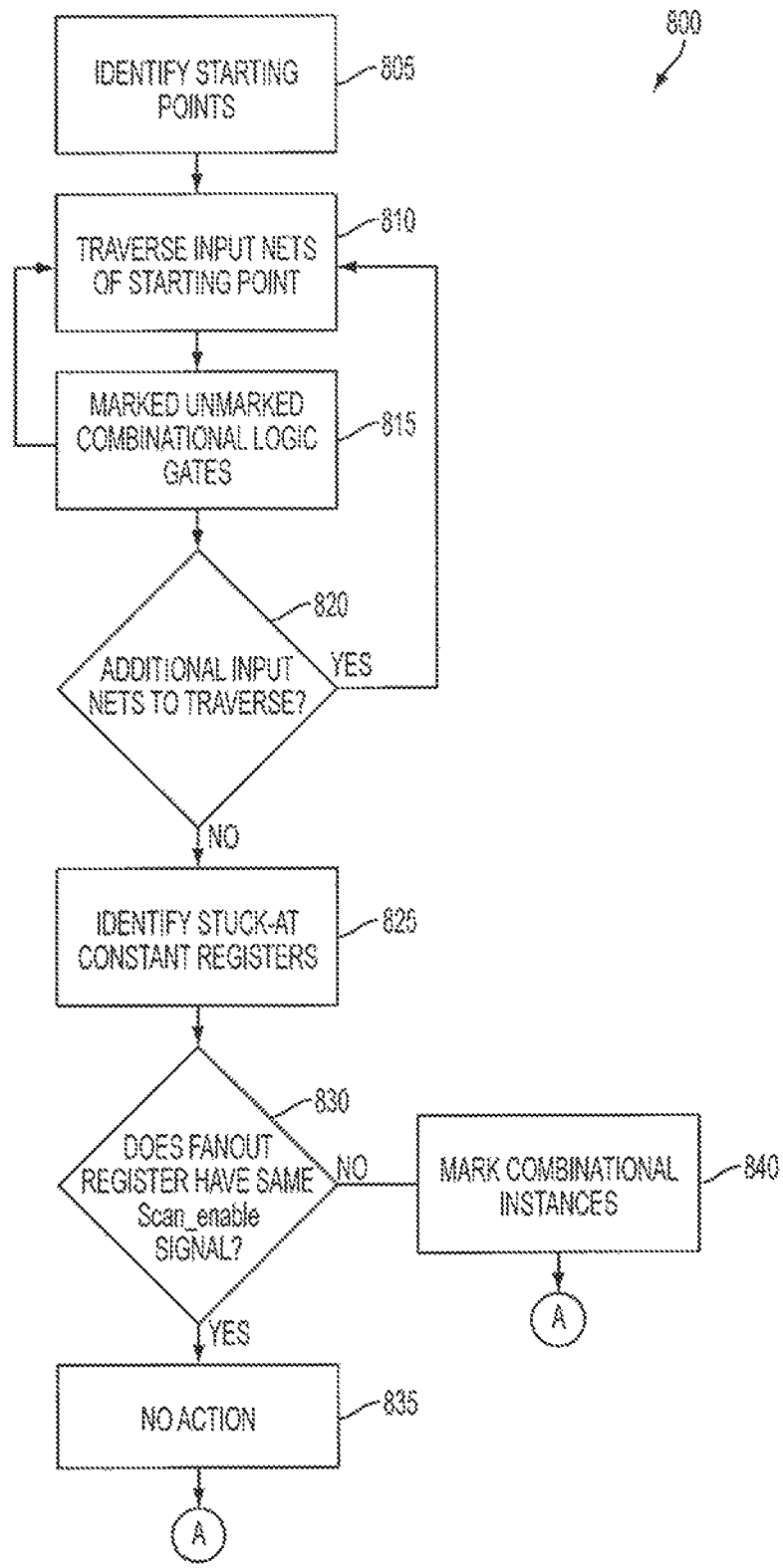
FIGS. 8A and 8B illustrate a flowchart for performing the redundant logic analysis and optimization according to exemplary embodiment of the present disclosure.
Figure 8B:
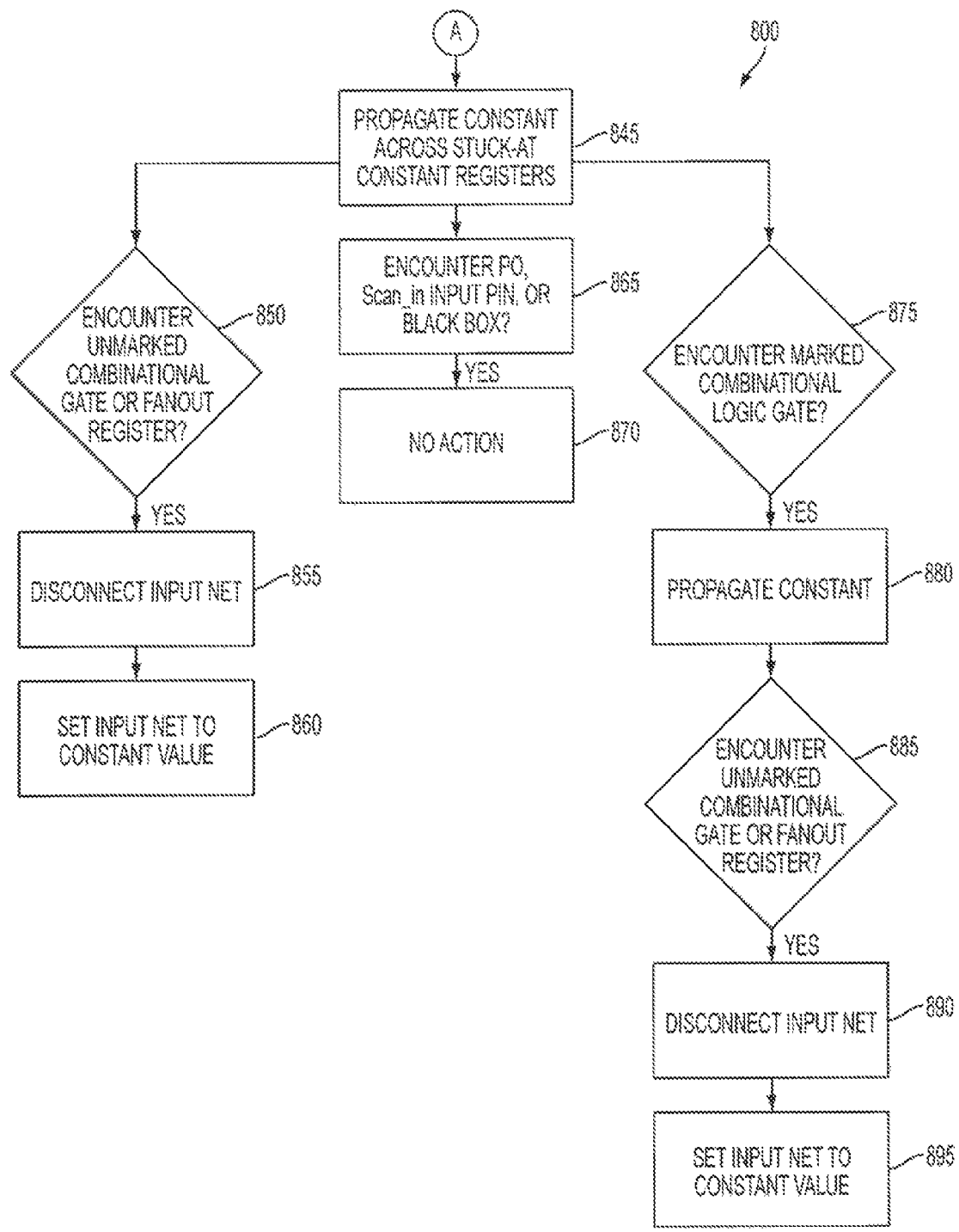

FIGS. 8A and 8B illustrate a flowchart for optimizing a logic design of an integrated circuit by removing redundant logic according to exemplary embodiment of the present disclosure. As shown in FIG. 8A, the first step 805 of method 800 is to identify each primary output (PO), black box, each register's control pins (e.g., CLK, scan_enable SE, scan_input SI, clear input, preset input, and the like), and any other sequential cells (e.g., latches, integrated clock gating cells, and the like) in the logic design or a portion of the logic design of an integrated circuit. Each of the identified units of the logic design is deemed a separate starting point of the redundant logic analysis for the logic design being optimized according to the exemplary method. It is noted that for system-on-chip (SOC) design, designers commonly use IP such as compiled block memory and/or processor cores, which have their own built-in-self-test (BIST) to cover their own testability issues. From a scan chain insertion perspective, these blocks and cores may be viewed as "black boxes" that can be bypassed during the actual scan without significant loss of testability.

Once the starting points of the analysis are identified at step 805, the input net of each starting point is traversed. During traverse of the input net, if a combinational logic gate, such as an AND gate, is encountered (step 810), the method determines whether the combination gate is already marked or identified for potential redundant logic. If it is not marked, the method marks the encountered combination logic gate for potential logic redundancy (step 815) and continued to traverse the input net to the next combinational logic gate. In other words, the traverse of the input net from each starting point of the logic design continues until a marked combinational logic gate or an end point is encountered. If the combinational logic gate has already been marked/identified for potential logic redundancy or if the traverse encounters an endpoint, the method continues to step 820. In the exemplary embodiment, an end point for the traverse of the input net can be a primary input (PI) or an output Q of another register. At step 820, the exemplary method determines if any additional input nets for the identified starting points need to be traversed for potential logic redundancy. If the resulting check at step 820 is yes, the redundancy analysis returns to step 810 for the next identified starting point. If the input net of every identified starting point has been traversed, the method proceeds to step 825.

At step 825, the method identifies all stuck-at constant registers in the scan chain whose output Q is stuck at a constant value, either "0" or "1". As discussed above with respect to FIGS. 4A, 5A, 6A, and 7A, the exemplary method contemplates four separate instances or configurations in which a register/flip flop is stuck at a constant output value. Accordingly, at step 825, the method identifies registers in the logic design as stuck-at constant registers when any tested register is connected within the netlist) according to any of the configurations shown in FIGS. 4A, 5A, 6A, and 7A.

Next, at step 830, the output net for each identified stuck-at constant register is traversed and each fanout register (i.e., register downstream in the path of the output net) is analyzed. If the fanout register has the same control signal (e.g., scan_enable signal SE) as the stuck-at constant register, no action is taken (step 835). If the fanout register has a different control or scan_enable signal SE than the stuck-at constant register, all combinational instances between the two registers are marked for potentially redundancy (step 840). After both steps 835 and 840, once all output nets for the stuck-at constant register are traversed to all fanout registers, the method checks whether there are any other stuck-at constant registers that require analysis (this loop is not shown in FIG. 8A). If "yes", the method returns to step 830 and again traverses the output net of the next stuck-at constant register. If all stuck-at constant registers have been analyzed, the method proceeds to step 845 where the scan chain is optimized, i.e., redundant logic is removed from the logic design under test.

As shown in FIG. 8B, for each identified stuck-at constant register, the constant input is propagated across the register through its output net at step 845. If the propagation encounters an unmarked combinational gate or functional input D of a fanout register that has the same scan_enable signal SE as the stuck-at constant register (step 850), the input net of the unmarked combination gate or the functional input D of the fanout register is disconnected (step 855) and the input net is set to the same constant value (either a "0" or a "1") as the stuck-at constant register (step 860). It should be appreciated that by disconnecting the output net of the stuck-at constant register, the disclosed method is eliminating the redundant logic and shortening the critical path of the logic design.

If the propagation encounters a primary output (PO) of the scan chain, a scan_in signal SI of a scan cell, a black box (step 865), or other control pins of flip-flops or other sequential cells, the method determines that the input of the stuck-at constant register cannot be propagated and does nothing for the encountered PO, scan cell, black box, or other sequential cell (step 870).

Finally, if the propagation of the stuck-at constant register encounters a marked combinational gate (step 875), the net between the stuck-at constant register and the encountered marked combinational gate is not disconnected. However, the constant value is propagated across this gate and its output net is traversed (step 880). If the subsequent traverse of the output net of the marked computational gate encounters an unmarked combinational gate or functional input D of a fanout register that has the same scan_enable signal SE as the stuck-at constant register (step 885), the input net of the unmarked combination gate or the functional input D of the fanout register is disconnected (step 890) and the input is set to the same constant value (either a "0" or a "1") as the stuck-at constant register (step 895). After each of steps 860, 870 and 895, the method returns to step 845 (this loop is not shown in FIG. 8B) until the output net of all identified stuck-at constant registers have been propagated and all redundant logic of the logic design has been removed.

Figure 9A:
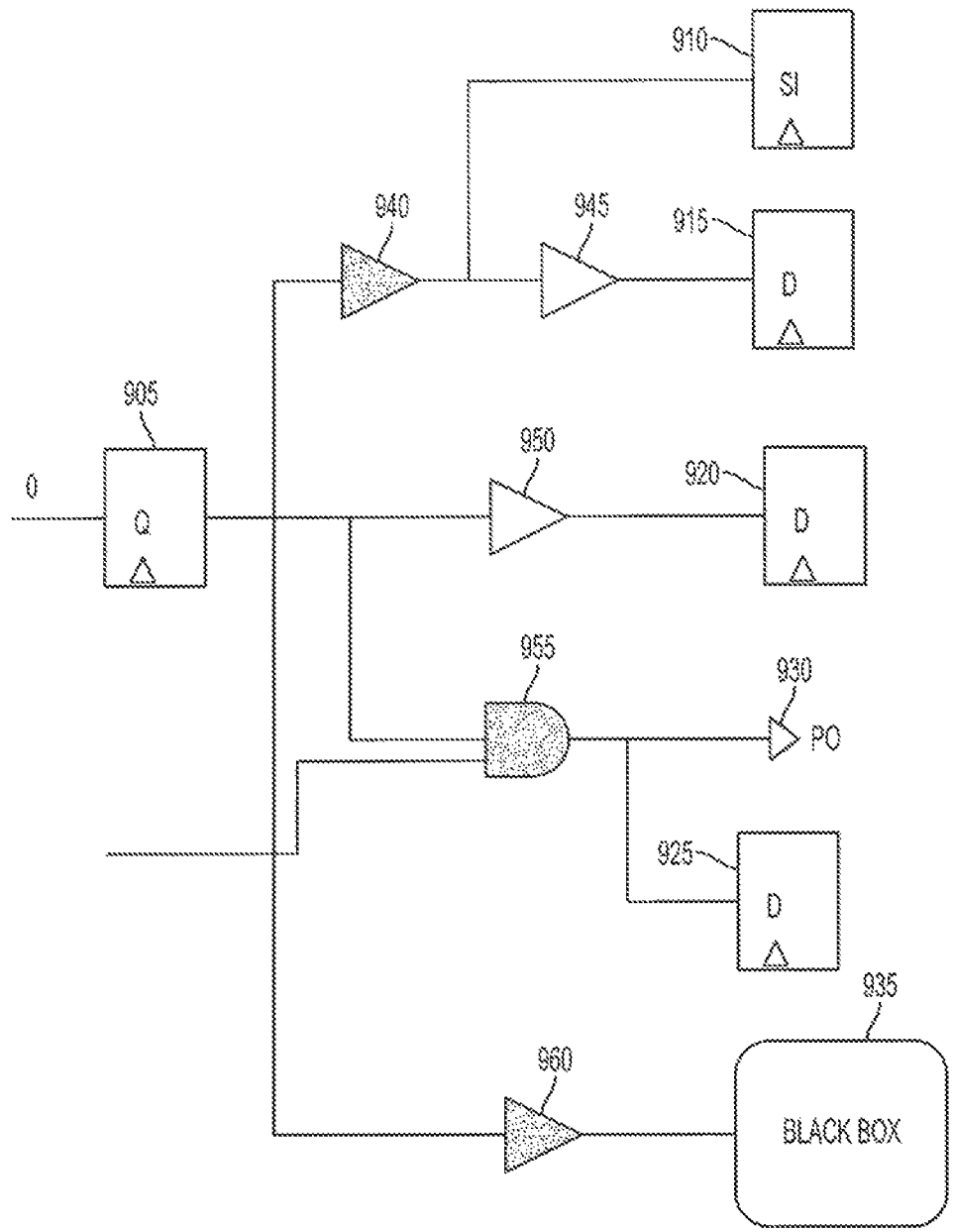
FIG. 9A illustrates a block diagram of an exemplary logic design before optimization according to the present disclosure.
Figure 9B:
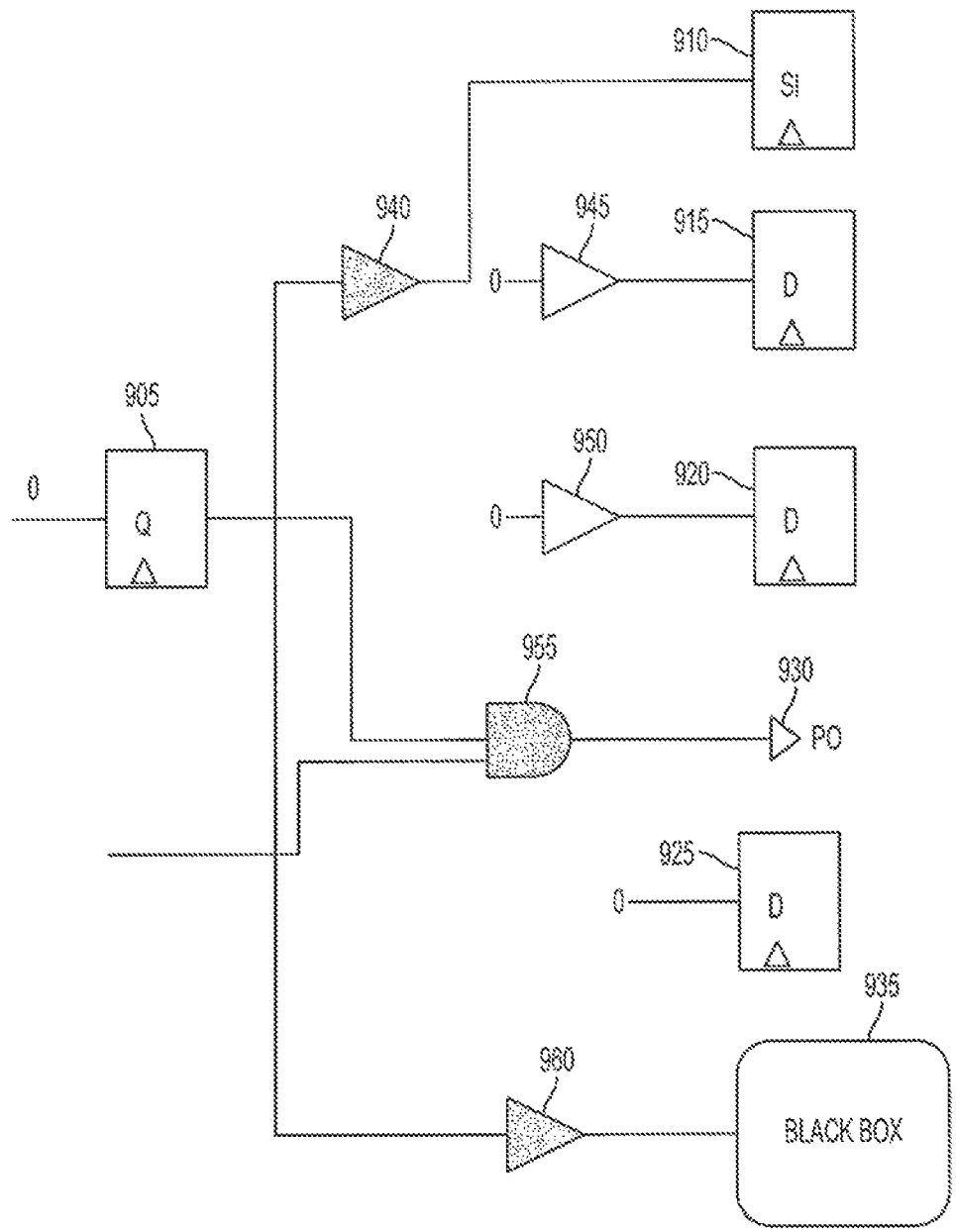
FIG. 9B illustrates a block diagram of the exemplary logic design of FIG. 9A after optimization employing the method described above with respect to FIGS. 8A and 8B.

FIG. 9A illustrates a block diagram of an exemplary logic design of an integrated circuit before optimization according to the present disclosure and FIG. 9B illustrates a block diagram of the exemplary logic design after optimization employing the method described above with respect to FIGS. 8A and 8B. It should be appreciated that the block diagram illustrated in FIGS. 9A and 9B is provided for illustrative purposes only and that the disclosed system and method are in no way limited to this exemplary design.

As shown in FIGS. 9A and 9B, the exemplary logic design of an integrated circuit includes scan cells 905, 910, 915, 920, and 925, which each include a flip flop register and multiplexer as discussed above (also referred to as registers), but are not shown in these figures so as to not unnecessarily obscure the aspects of the invention. Furthermore, a primary output PO 930, a black box 935, and combinational logic gates 940, 945, 950, 955 and 960. In the exemplary embodiment, logic gates 940, 945, 950 and 960 are buffers and logic gate 955 is an AND gate.

FIG. 9A illustrates the block diagram of the exemplary logic design 900 after the preparation steps of the exemplary method. That is, after steps 805-820, the identified combinational logic gates are marked, which are buffers 940 and 960 and AND gate 955 as shown in FIG. 9A (the marked logic gates being identified as highlighted gates for potential logic redundancy). As described above, each of the primary outputs (PO), black boxes, register control pins, and other sequential cells are deemed a starting points for the logic redundancy analysis. In FIG. 9A, such starting points include register 910, primary output PO 930 and black box 935. According to the method, the input net of each of these starting points is traversed and all combinational logic gates that are encountered during the traverse are marked for potentially redundant logic analysis. In FIG. 9A, the input net of register 910 encounters buffer 940, which is marked for potential logic redundancy. Moreover, the input net of primary output PO 930 encounters AND gate 955, which is therefore marked for potential logic redundancy. Similarly, the input net of black box 935 encounters buffer 960, which is also marked. Next, in each input net (i.e., from buffers 940, 960 and AND gate 955), the traverse reaches an end point, which is the output Q of register 905 as described above. It should also be appreciated that registers 915, 920 and 925 are not identified as starting points according to the method described above, so the method does not traverse their respective input nets.

Applying the algorithms described above with respect to FIGS. 4A-7A, the stuck-at constant registers of the exemplary circuit are identified. In the example of FIG. 9A, register 905 is identified as a stuck-at constant register, meaning that its output is constant (either a "0" or a "1") when its selector signal, the scan_enable signal EN, is not enabled. In this instance, the functional input value D of register 905 is illustrated as a "0". Although not shown, the example assumes that the preset input pin of register 905 is disabled or does not exist. This is how the method would identify register 905 as a stuck-at constant register, as explained in detail with respect to FIG. 6A. For clarification purposes, it is noted that if the preset pin were enabled, the exemplary method would not identify register 905 as a stuck-at constant register.

Further preparation of the exemplary circuit illustrated in FIG. 9A is contemplated according to steps 830-840 of method 800 illustrated in FIG. 8A. In particular, for identified stuck-at constant register 905, the output net is traversed and each fanout register is analyzed. If the fanout register has the same selector signal (e.g., the same scan_enable signal SE) as the stuck-at constant register, no action is taken. This is the case for registers 915, 920, and 925. Although not shown explicitly, in the exemplary logic design, each of these registers has the same scan_enable signal SE as register 905. This is shown by the input of each of registers 915, 920, and 925 being illustrated as an input "D". In other words, the scan_enable signal SE for these registers is a low "0" or not enabled. Although not shown in the example of FIG. 9A, for any encountered registers that have a different selector signal than register 905, all combinational instances between the two registers would be marked for potential logic redundancy.

Once all combinational logic instances/gates are marked, the circuit is optimized (i.e., redundant logic is removed) according to the exemplary embodiment. FIG. 9B illustrates the result of the optimization according to the method above with respect to FIGS. 8A and 8B.

As described above, the constant of the stuck-at constant register 905 is propagated through the output net. If the propagation encounters an unmarked combinational gate or functional input D of a fanout register that has the same selector signal (e.g., scan_enable signal SE) as the stuck-at constant register, the input net of the unmarked combination gate or the functional input D of the fanout register is disconnected and the input is set to the same constant value (either a "0" or a "1") as the stuck-at constant register. In FIG. 9B, this propagation is illustrated with respect buffer 950 and register 920. As shown in the example, buffer 950 is not marked. Therefore, the net between register 905 and buffer 950 is disconnected and the input to buffer 950 is set to the same value as the stuck-at constant of register 905, which in this example is a constant value of "0".

As further described above, if the propagation encounters a primary output (PO), a scan_in signal SI of a scan cell (e.g., register 910), a black box, and/or a control input pin of a register, the constant input of the stuck-at constant register cannot be propagated and no further action is taken for each of these output nets from the stuck-at constant register 905. This propagation is illustrated when traverse of the output net of stuck-at constant register 905 reaches the scan_in input IN of register 910, the primary output PO 930 and the black box 935. As shown, the net between the register 905 and each of register 910, PO 930 and black box 935 is unchanged between FIGS. 9A and 9B.

Finally, if the propagation of the stuck-at constant register 905 encounters a marked combinational gate, the net between the stuck-at constant register and the encountered marked combinational gate is not disconnected. However, the constant value is propagated through this gate and its output is traversed. In FIG. 9B, this scenario is illustrated for marked logic instances 940, 955 and 960. In these cases, when the subsequent traverse reaches an unmarked combinational gate (e.g., buffer 945) or functional input D of a fanout register (e.g., register 925) that has the same scan_enable signal SE as the stuck-at constant register, the input net of the unmarked combinational gate 945 and the functional input D of the fanout register 925 are both disconnected and the input pin for each is set to the same constant value (in this case a constant "0") as the stuck-at constant register 905.

Accordingly, when comparing FIGS. 9A and 9B, it should be appreciated that the redundant logic illustrated in circuit 9A is removed by disconnecting the input nets before each of buffer 945, 950 and register 925 and setting the input value to the same constant as the stuck-at constant register 905. Furthermore, it is noted that while only a single stuck-at constant register is illustrated in FIGS. 9A and 9B (i.e., register 905), it is contemplated that this same process can be performed for a logic design having numerous stuck-at constant registers. Moreover, for a logic design of an integrated circuit having hundreds of thousands of logic elements, it should be appreciated that the reduction of a significant amount of redundant logic and connections using the disclosed method and system will result in significant savings in chip area of the manufactured IC and provide increased flexibility of timing optimization.

Figure 10:
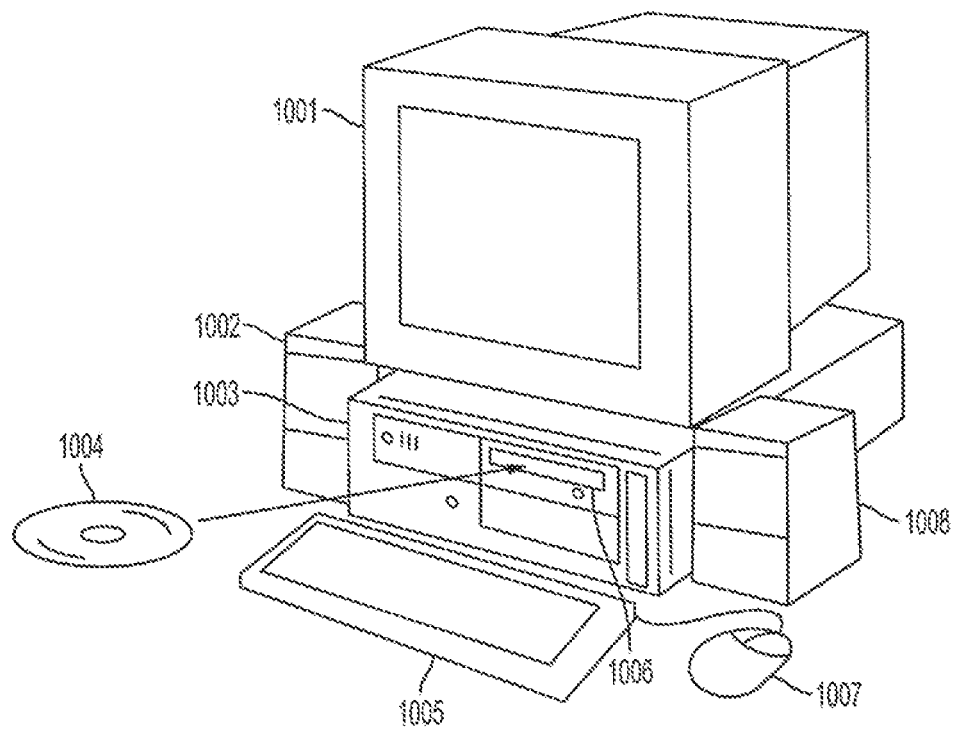
FIG. 10 illustrates an exemplary general-purpose computer system according to an embodiment.

Finally, the method disclosed herein can be implanted on a computer system configuration that analyzes a model of a logic design of an integrated circuit and removes redundant logic according to the method described above. FIG. 10 illustrates an exemplary general-purpose computer system, according to an embodiment. The computer system comprises a computer 1003 configured to read storage media 1004 at its drive 1006. The computer system further includes a monitor 1001 for the user to view visual output from the computer 1003, and keyboard 1005 and mouse 1007 for the use to input data and commands to computer 1003. Storage media 1004, although illustrated as an optical disk for an optical drive 1006 for ease of understanding in this illustration, may be any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions. The storage media or medium may be internal to the computer 1003, or external and attachable through a communication interface. Drive 1006 may be any drive suitable for reading storage media 1004 or any interface suitable to couple storage media 1004 to the bus of computer 1003 when storage media 1004 is read. The exemplary computer system can be programmed by a user according to the various disclosed embodiments to perform the methods described above. The computer system may be programmed by reading instructions stored in internal or external computer storage media 1004.

It is reiterated that the above description and drawings are only to be considered illustrative of specific embodiments, which achieve the features and advantages described herein. Modifications and substitutions to specific process conditions can be made. Accordingly, the embodiments in this patent document are not considered as being limited by the foregoing description and drawings.

We claim:

1. A processor-implemented method of removing redundant logic from a synthesized logic circuit design that was generated from an integrated circuit design that has been synthesized using a computer-based synthesis tool, thereby reducing area of an integrated circuit fabricated from the integrated circuit design and increasing flexibility of timing optimization, the method comprising:
    providing, in memory of a computer system, at least a portion of the synthesized logic circuit design that includes a plurality of interconnected combinational and sequential logic gates;
    selecting at least one starting point in the logic design;
    traversing an input net of the at least one starting point towards the identified at least one register;
    marking a combinational logic gate encountered during traverse of the input net;
    identifying at least one register in the at least a portion of the synthesized logic circuit design that has a constant output value when a selector or control signal of the register is either enabled or disabled;
    propagating the constant output value across an output net of the identified at least one register;
    identifying redundant logic of the at least a portion of the synthesized logic circuit design based on the propagation of the constant output value across the output net of the identified at least one register; and
    modifying the at least a portion of the synthesized logic circuit design stored in the memory of the computer system to remove the identified redundant logic.

2. The processor-implemented method according to claim 1, wherein propagating the constant output value further comprises:
    propagating the constant output value across an unmarked combinational logic gate in the output net of the identified at least one register; and
    if a register having a same selector signal as the identified at least one register is in an output net of the unmarked combinational logic gate, disconnecting the output net of the identified at least one register from an input net of the unmarked combinational logic gate and providing the constant output value as an input value to the input net of the identified unmarked combinational logic gate.

3. The processor-implemented method according to claim 1, wherein propagating the constant output value further comprises:
    propagating the constant output value across the marked combinational logic gate in the output net of the identified at least one register; and
    if a register having a same selector signal as the identified at least one register is coupled in an output net of the marked combinational logic gate, disconnecting the output net of the marked combinational logic gate from an input net of the register having the same selector and providing the constant output value to the input net of the register having a same selector signal.

4. The processor-implemented method according to claim 1, wherein selecting the at least one starting point comprises selecting the at least one starting point in the logic design from the group of a primary output, a black box, a scan_in input pin of a register, and a control input pin of a register.

5. The processor-implemented method according to claim 1, wherein identifying at least one register in the logic design that has a constant output value comprises identifying a register as the register with a constant output value if:
    the register has an enabled clear control signal and a disable or disconnected preset control signal;
    the register has an enabled preset control signal and a disabled or disconnected clear control signal;
    the register has a functional data input value of 0 and a disabled or disconnected preset control signal; or
    the register has a functional data input value of 1 and a disabled or disconnected clear control signal.

6. A computing system for removing redundant logic from a synthesized logic circuit design that was generated from an integrated circuit design that has been synthesized using a computer-based synthesis tool, thereby reducing area of an integrated circuit fabricated from the integrated circuit design and increasing flexibility of timing optimization, the system comprising:

a storage device encoded with information representative of at least a portion of the synthesized logic circuit that includes a plurality of interconnected combinational and sequential logic gates; and a computing device in communication with the storage device, the computing device configured to:
   select at least one starting point in the logic design;
   traverse an input net of the at least one starting point towards the identified at least one register; and
   mark a combinational logic gate encountered during traverse of the input net;
   identify at least one register in the at least a portion of the synthesized logic circuit design that has a constant output value when a selector or control signal of the register is either enabled or disabled;
   propagate the constant output value across an output net of the identified at least one register;
   identify redundant logic of the at least a portion of the synthesized logic circuit design based on the propagation of the constant output value across the output net of the identified at least one register; and
   modify the at least a portion of the synthesized logic circuit design in the memory of the computer system to remove the identified redundant logic.

7. The computing system according to claim 6, wherein, when the computing device propagates the constant output value, the computing device is further configured to:
   propagate the constant output value across an unmarked combinational logic gate in the output net of the identified at least one register; and
   if a register having a same selector signal as the identified at least one register is in an output net of the unmarked combinational logic gate, disconnect the output net of the identified at least one register from an input net of the unmarked combinational logic gate and provide the constant output value to as an input value to the input net of the identified unmarked combinational logic gate.

8. The computing system according to claim 6, wherein, when the computing device propagates the constant output value, the computing device is further configured to:
   propagate the constant output value across the marked combinational logic gate in the output net of the identified at least one register; and
   if a register having a same selector signal as the identified at least one register is coupled in an output net of the marked combinational logic gate, disconnect the output net of the marked combinational logic gate from an input net of the register having the same selector and provide the constant output value to the input net of the register having a same selector signal.

9. The computing system according to claim 6, wherein, when the computing device selects the at least one starting point, the computing device is further configured to select the at least one starting point in the logic design from the group of a primary output, a black box, a scan_in input pin of a register, and a control input pin of a register.

10. The computing system according to claim 6, wherein the computing device is further configured to identify the at least one register in the logic design that has a constant output value if:
   the register has an enabled clear control signal and a disable or disconnected preset control signal;
   the register has an enabled preset control signal and a disabled or disconnected clear control signal;
   the register has a functional data input value of 0 and a disabled or disconnected preset control signal; or
   the register has a functional data input value of 1 and a disabled or disconnected clear control signal.

11. A non-transitory computer-readable non-transitory storage medium having stored thereon a plurality of instructions, said plurality of instructions when executed by a computer, cause said computer to perform operations comprising:
   selecting at least one starting point in the logic design;
   traversing an input net of the at least one starting point towards the identified at least one register; and
   marking a combinational logic gate encountered during traverse of the input net;
   identifying at least one register in a logic design of at least a portion of a synthesized logic circuit design that was generated from an integrated circuit design that has been synthesized using a computer-based synthesis tool, where the synthesized logic circuit design includes a plurality of interconnected combinational and sequential logic gates, in which the at least one register has a constant output value when a selector or control signal of the register is either enabled or disabled;
   propagating the constant output value across an output net of the identified at least one register;
   identifying redundant logic of the least a portion of a synthesized logic circuit design based on the propagation of the constant output value across the output net of the identified at least one register; and
   modifying the least a portion of a synthesized logic circuit design in the memory of the computer system to remove the identified redundant logic, thereby reducing area of an integrated circuit fabricated from the integrated circuit design and increasing flexibility of timing optimization.

12. The non-transitory computer-readable non-transitory storage medium of claim 11, wherein the plurality of instructions when executed by a computer, cause said computer to further perform:
   propagating the constant output value across an unmarked combinational logic gate in the output net of the identified at least one register; and
   if a register having a same selector signal as the identified at least one register is in an output net of the unmarked combinational logic gate, disconnecting the output net of the identified at least one register from an input net of the unmarked combinational logic gate and providing the constant output value to as an input value to the input net of the identified unmarked combinational logic gate.

13. The non-transitory computer-readable non-transitory storage medium of claim 11, wherein the plurality of instructions when executed by a computer, cause said computer to further perform:
   propagating the constant output value across the marked combinational logic gate in the output net of the identified at least one register; and
   if a register having a same selector signal as the identified at least one register is coupled in an output net of the marked combinational logic gate, disconnecting the output net of the marked combinational logic gate from an input net of the register having the same selector and providing the constant output value to the input net of the register having a same selector signal.

14. The non-transitory computer-readable non-transitory storage medium of claim 11, wherein the plurality of instructions when executed by a computer, cause said computer to further perform, during selecting the at least one starting point, selecting the at least one starting point in the logic design from the group of a primary output, a black box, a scan_in input pin of a register, and a control input pin of a register.

15. The non-transitory computer-readable non-transitory storage medium of claim 11, wherein the plurality of instructions when executed by a computer, cause said computer to further perform identifying a register as the register with a constant output value if:
- the register has an enabled clear control signal and a disable or disconnected preset control signal;
- the register has an enabled preset control signal and a disabled or disconnected clear control signal;
- the register has a functional data input value of 0 and a disabled or disconnected preset control signal; or
- the register has a functional data input value of 1 and a disabled or disconnected clear control signal.

* * * * *